United States Patent
Landow

(10) Patent No.: US 10,477,283 B2
(45) Date of Patent: Nov. 12, 2019

(54) CARRIER-BASED ACTIVE TEXT ENHANCEMENT

(71) Applicant: ECHOSTAR TECHNOLOGIES L.L.C., Englewood, CO (US)

(72) Inventor: Kate Megan Carney Landow, Denver, CO (US)

(73) Assignee: DISH TECHNOLOGIES LLC, Englewood, CO (US)

(*) Notice: Subject to any disclaimer, the term of this patent is extended or adjusted under 35 U.S.C. 154(b) by 0 days.

(21) Appl. No.: 14/720,633

(22) Filed: May 22, 2015

(65) Prior Publication Data

US 2016/0345078 A1 Nov. 24, 2016

(51) Int. Cl.
*H04N 21/81* (2011.01)
*H04N 21/235* (2011.01)
*H04N 21/262* (2011.01)
*H04N 21/432* (2011.01)
*H04N 21/434* (2011.01)
*H04N 21/44* (2011.01)
*H04N 21/6543* (2011.01)
(Continued)

(52) U.S. Cl.
CPC ..... *H04N 21/8133* (2013.01); *H04N 21/2353* (2013.01); *H04N 21/26283* (2013.01); *H04N 21/432* (2013.01); *H04N 21/435* (2013.01); *H04N 21/4347* (2013.01); *H04N 21/44008* (2013.01); *H04N 21/6543* (2013.01); *H04N 21/812* (2013.01); *H04N 21/8545* (2013.01); *H04N 21/8547* (2013.01); *H04N 21/85406* (2013.01)

(58) Field of Classification Search
CPC ............ H04N 21/8133; H04N 21/432; H04N 21/4347; H04N 21/44008; H04N 21/6543; H04N 21/812; H04N 21/85406; H04N 21/8545; H04N 21/8547
See application file for complete search history.

(56) References Cited

U.S. PATENT DOCUMENTS 6,970,641 B1* 11/2005 Pierre ................. H04N 21/643
                                                                         386/239
7,222,155 B1*  5/2007 Gebhardt ............. H04N 21/21
                                                                         709/204
(Continued)

OTHER PUBLICATIONS

European Patent Office International Searching Authority, International Search Report and Written Opinion for International Application No. PCT/US2016/030980 dated Sep. 29, 2016.
(Continued)

*Primary Examiner* — Randy A Flynn
(74) *Attorney, Agent, or Firm* — Lorena & Kopf LLP

(57) ABSTRACT

Auxiliary or enhanced features associated with broadcast television programs are activated using carrier-based active text enhancement (CATE) signals embedded within timed text (TT) associated with the broadcast program. The active text enhancements can be interpreted by the viewer's set top box (STB) or other receiver to activate software applications, video clips, imagery, uniform resource locators (URLs), interactive interface features or the like on either or both of primary or secondary displays. Timed text enhancements can flexibly reference different types of content to provide richer and more powerful viewer experiences for the viewer.

20 Claims, 3 Drawing Sheets

Figure 1:
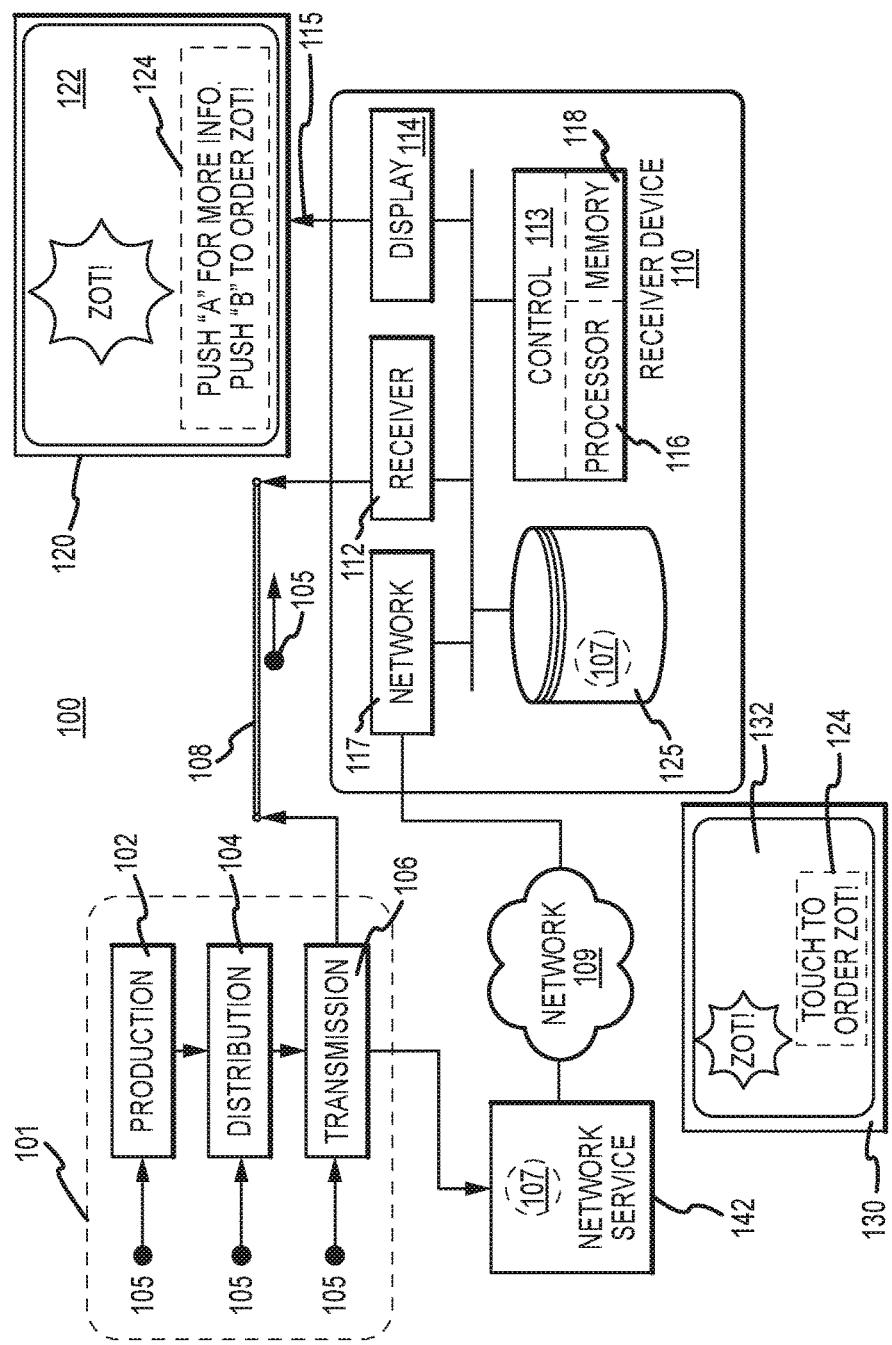

(51) Int. Cl.
*H04N 21/854* (2011.01)
*H04N 21/8545* (2011.01)
*H04N 21/8547* (2011.01)
*H04N 21/435* (2011.01)

(56) References Cited

U.S. PATENT DOCUMENTS

| | | | | |
|---|---|---|---|---|
| 7,302,696 | B1* | 11/2007 | Yamamoto | H04N 21/858 348/E7.061 |
| 7,320,134 | B1* | 1/2008 | Tomsen | H04N 21/25891 348/E7.031 |
| 8,424,037 | B2 | 4/2013 | Landow et al. | |
| 9,009,339 | B2 | 4/2015 | Landow et al. | |
| 2002/0056129 | A1* | 5/2002 | Blackketter | H04N 21/235 725/112 |
| 2002/0129364 | A1* | 9/2002 | Smith | H04N 21/4316 725/37 |
| 2002/0194620 | A1* | 12/2002 | Zdepski | H04N 21/8173 725/138 |
| 2003/0084453 | A1* | 5/2003 | Laughlin | H04N 21/812 725/60 |
| 2003/0208768 | A1* | 11/2003 | Urdang | H04N 21/2402 725/95 |
| 2004/0003400 | A1* | 1/2004 | Carney | H04N 21/4438 725/42 |
| 2004/0034875 | A1 | 2/2004 | Bulkowski et al. | |
| 2004/0131335 | A1* | 7/2004 | Halgas, Jr. | H04N 21/4126 386/213 |
| 2005/0120391 | A1* | 6/2005 | Haynie | H04N 21/23412 725/135 |
| 2008/0159713 | A1* | 7/2008 | Chou | H04N 21/8126 386/357 |
| 2008/0267589 | A1* | 10/2008 | Turner | H04N 21/2402 386/353 |
| 2010/0131975 | A1* | 5/2010 | Landow | H04N 21/235 725/34 |
| 2011/0296472 | A1* | 12/2011 | Soldan | H04N 21/4788 725/81 |
| 2011/0320627 | A1 | 12/2011 | Landow et al. | |
| 2012/0144430 | A1* | 6/2012 | Steele | H04N 21/84 725/55 |
| 2012/0320267 | A1 | 12/2012 | Landow | |
| 2013/0076981 | A1* | 3/2013 | Labrozzi | H04N 21/4884 348/500 |
| 2013/0250173 | A1* | 9/2013 | Eyer | H04N 21/2362 348/467 |
| 2013/0291001 | A1* | 10/2013 | Besehanic | H04N 21/44204 725/20 |
| 2013/0347030 | A1* | 12/2013 | Oh | H04N 21/478 725/32 |
| 2014/0115060 | A1* | 4/2014 | Kim | H04N 21/8586 709/204 |

OTHER PUBLICATIONS

"Text of ISO/IEC FDIS 14496-30 Timed Text and Other Visual Overlays in ISO Base Media File Format", 105. MPEG Meeting; Jul. 29, 2013-Aug. 2, 2013; Vienna; (Motion Picture Expert Group or ISO/IEC JTC1/SC29/WG11), No. N13676, Aug. 10, 2013 (Aug. 10, 2013), XP030020424, version 1.

"Text of ISO/IEC FDIS 14496-30 Timed Text and Other Visual Overlays in ISO Base Media File Format", 105. MPEG Meeting; Jul. 29, 2013-Aug. 2, 2013; Vienna; (Motion Picture Expert Group or ISO/IEC JTC1/SC29/WG11), No. N13676, Aug. 10, 2013 (Aug. 10, 2013), XP030020424, Version 2.

Timed Text (TT) Authoring Format 1.0 Use Cases and Requirements W3C Working Group Note Apr. 27, 2006 retrieved from the internet at https://www.w3.org/TR/ttaf1-req/ on Dec. 2, 2016.

XML Linking Language (XLink) Version 1.0 W3C Recommendation Jun. 27, 2001 retrieved from the internet at https://www.w3.org/TR/xlink/ on Dec. 2, 2016.

Timed text from Wikipedia, retrieved from the internet at https://en.wikipedia.org/w/index.php?title=Timed_text&oldid=647547691 on Dec. 2, 2016.

SMPTE ST 2052-1:2010 SMPTE Standard Timed Text Format (SMPTE-TT) retrieved from the internet at https://www.smpte.org/sites/default/files/st2052-1-2010.pdf on Dec. 2, 2016.

The International Bureau of WIPO, International Preliminary Report on Patentability in International Application No. PCT/US2016/030980 dated Dec. 7, 2017.

"Captioning at every seat . . . at every showing . . ." "Products" page retrieved from Personal Captioning Systems, Inc.'s internet site located at http://www.personalcaptioning.com/index_files/products.htm on Jul. 31, 2008, 3 pages.

"Support" page retrieved from Personal Captioning Systems, Inc.'s internet site located at http://www.personalcaptioning.com/index_files/support.htm on Jul. 31, 2008, 3 pages.

"Rear Window Captioning System" retrieved from Wikipedia internet site located at http://en/wikipedia.org/w/index.php?title=Rear_Window_Captioning_System&printable=y . . . on Jul. 31, 2008, 1 page.

"Descriptive Video Services" retrieved from Wikipedia internet site located at http://en.wikipedia.org/w/index.php?title=Descriptive_Video_Service . . . on Jul. 31, 2008, 4 pages.

"DVS Services" retrieved from WGBH's Internet site for Media Access Group located at http://main.wgbh.org/wgbh/pages/mag/services/description/ on Oct. 14, 2008, 2 pages.

"DVS FAQ" retrieved from WGBH's internet site for Media Access Group located at http://main.wgbh.org/wgbh/pages/mag/services/description/dvs-faq.html on Oct. 14, 2008, 2 pages.

"Digital cinema" retrieved from Wikipedia internet site located at http://en.wikipedia.org/w/index.php?title=Digital_cinema&printable=yes on Sep. 12, 2008, 7 pages.

\* cited by examiner

CARRIER-BASED ACTIVE TEXT ENHANCEMENT

TECHNICAL FIELD

The following discussion generally relates to expanding the capabilities of television or other broadcast video programming through active enhancements provided within timed text.

BACKGROUND

In recent years, set top boxes and other television receivers have been enhanced to provide additional features beyond mere presentation of broadcast television content. For example, commercials in broadcast programs can now be augmented with additional features to allow viewers to obtain additional information, or to take other actions relating to the content shown on the television screen. Such features may be provided through user interaction with the main television display, and/or with a "second screen" device such as a tablet or other computer, a mobile phone or the like. Several content enhancement implementations are described in U.S. Patent Publication No. 2011/0320627, U.S. Pat. Nos. 8,424,037 and 9,009,339.

Current content enhancement techniques, however, have been found to be inadequate for modern rich content applications. Legacy systems, for example, are often limited in the amounts and types of content that can be supported. Systems based upon conventional closed captioning standards, for example, can be limited in their support for video content, software applications, second screen integration and/or the like.

It is therefore desirable to provide systems, devices and/or processes that improve the user experience through enhanced content. These and other desirable features and characteristics will become apparent from the subsequent detailed description and the appended claims, taken in conjunction with the accompanying drawings and this background section.

BRIEF SUMMARY

Various systems, devices and processes activate auxiliary or enhanced features associated with broadcast television programs by using carrier-based active text enhancement (CATE) signals that are embedded within timed text (TT) associated with the broadcast program. The active text enhancements can be interpreted by the viewer's set top box (STB) or other receiver to activate software applications, video clips, imagery, interactive interface features and/or the like on a primary and/or on a secondary display. In contrast to prior implementations, timed text enhancements can flexibly reference different types of content to provide a richer and more powerful viewer experience.

According to some embodiments, a set top box, television receiver, or other viewer-controlled system is able to provide auxiliary content associated with broadcast television programming by processing CATE signal that are delivered within a timed text stream that is associated with the broadcast content. The system suitably comprises a television receiver interface, a display interface, a data storage and a controller. The television receiver interface is configured to receive the broadcast television programming. The display interface is configured to provide imagery for presentation to a viewer. The data storage is configured to store data associated with the auxiliary content, and the controller is configured to interpret timed text in the received broadcast television programming and to thereby recognize one or more carrier-based text enhancement signals in the timed text. The carrier-based text enhancement signals initiate processing of the data associated with the auxiliary content that is stored in the data storage to thereby render the auxiliary content to the viewer for viewing via the display interface.

Other embodiments relate to processes for obtaining and presenting enhanced content to a viewer of a broadcast television program. The process may be executed by a set top box, television receiver, media player, video game player, tablet or other computer, digital video recorder, place shifting client or server, mobile phone and/or other receiver device. The method suitably comprises receiving the broadcast television programming by the receiver device, wherein the received broadcast television programming is associated with timed text that comprises at least one text enhancement signal that identifies the enhanced content and a time during presentation of the broadcast television program that the enhanced content is active; receiving the enhanced content at the receiver device; interpreting the timed text by the receiver device to thereby identify the at least one text enhancement signal; and, in response to the at least one text enhancement signal, the receiver device directing that the enhanced content be provided to the viewer during playback of the broadcast television program.

Additional embodiments, aspects and other features are described in more detail below.

BRIEF DESCRIPTION OF THE DRAWING FIGURES

Figure 2:
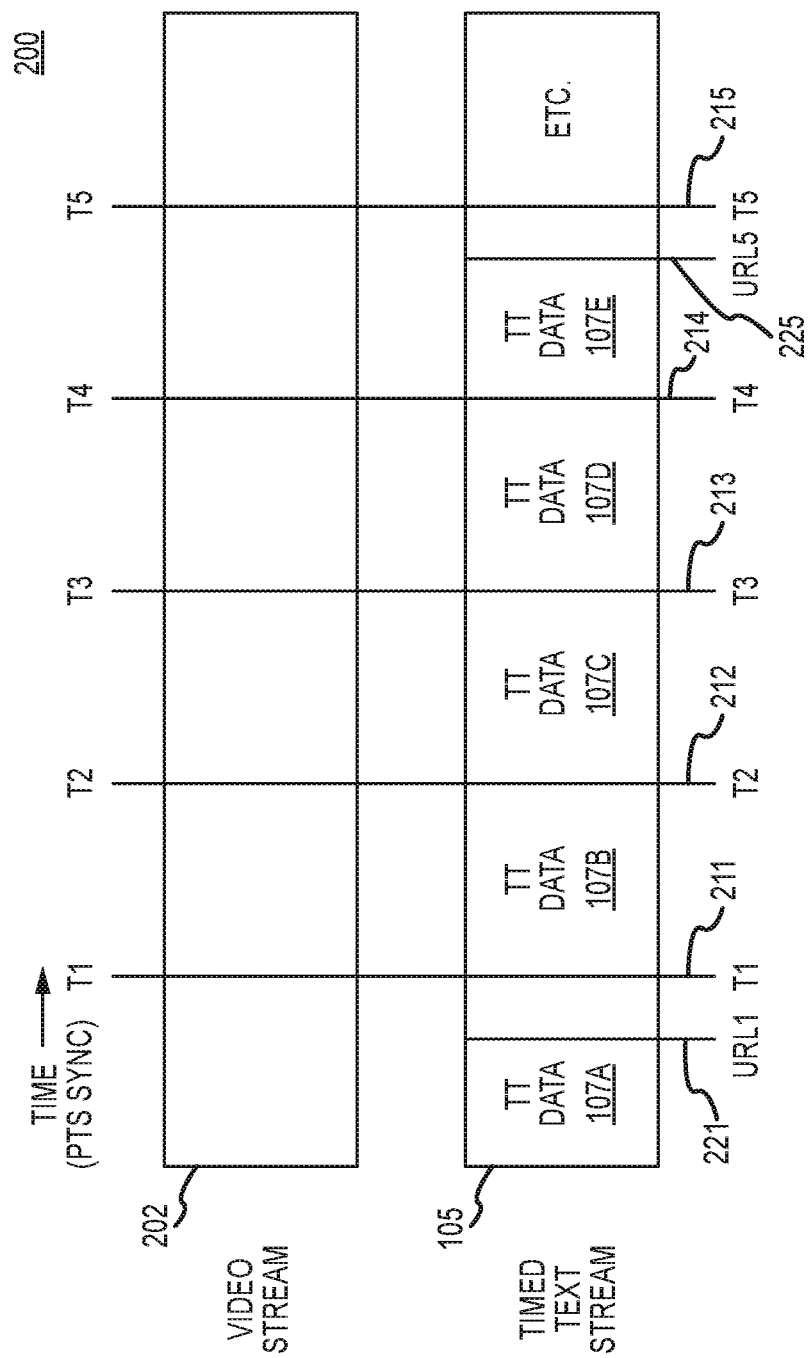
Figure 3:
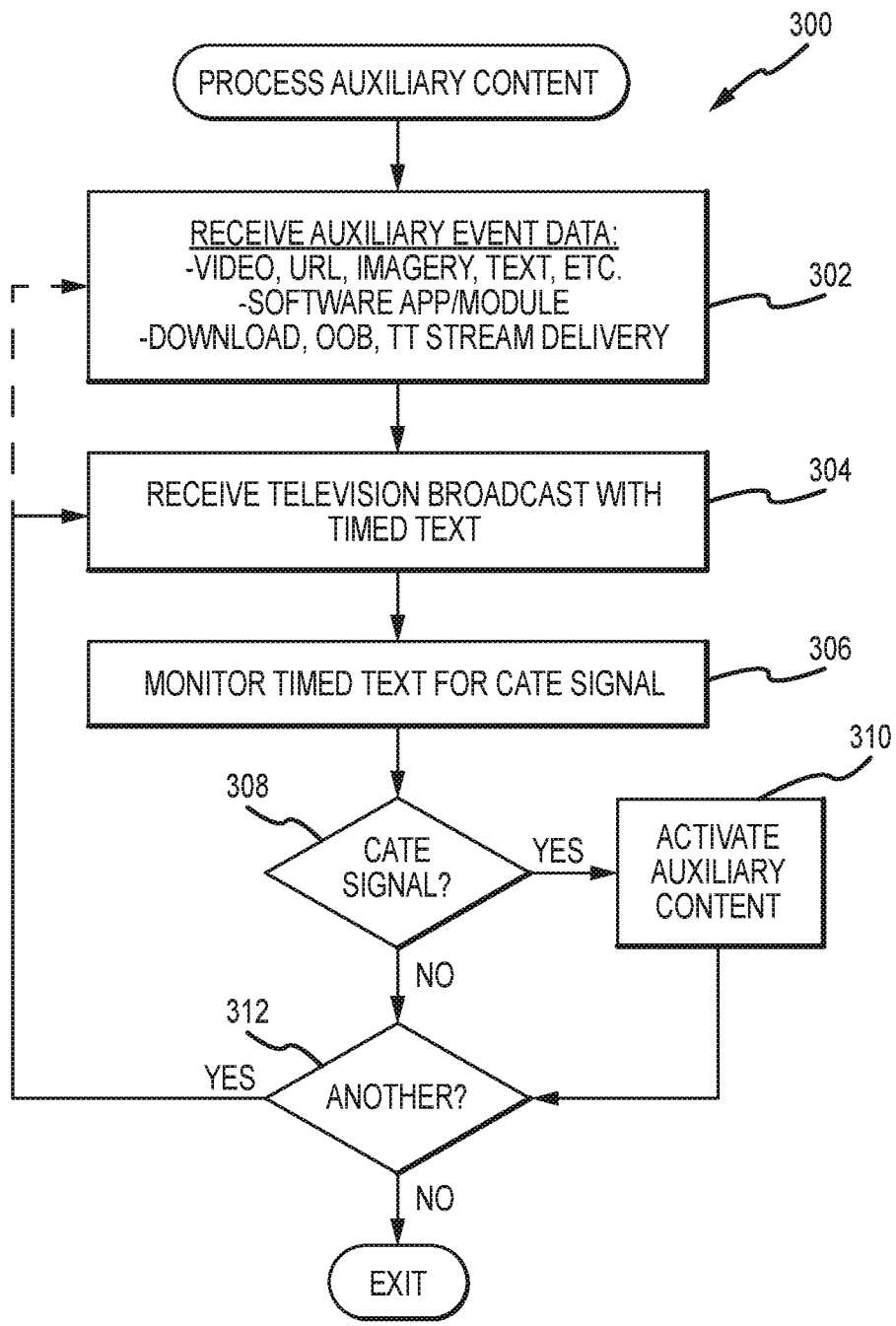

Exemplary embodiments will hereinafter be described in conjunction with the following drawing figures, wherein like numerals denote like elements, and FIG. 1 is a block diagram of an example system for providing carrier-based action text enhancements in a broadcast television stream;

FIG. 2 is a diagram showing an example timed text stream for a broadcast television stream; and FIG. 3 is a flowchart of an example process for handing carrier-based active text enhancements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, carrier-based active text enhancement (CATE) signals are embedded in a timed text (TT) stream that is delivered in conjunction the broadcast television signal. A SMPTE TT stream, for example, can be encoded with text enhancements and provided in conjunction with an MPEG or similar multiplex that encodes the broadcast programming. The text enhancements are interpreted by the television receiver device to activate auxiliary content or other supplemental events, as appropriate. Data that accompanies the text enhancement (e.g., video, image, text, software application/applet content, URLs and/or other data) can also be provided within the timed text stream, if desired, although other embodiments may obtain the data through other channels, as described more fully below.

CATE signals may be received at any time prior to the processing of the enhanced content. Generally speaking, it will be desirable for the receiver to obtain any auxiliary content prior to the broadcast of the text enhancement so that the auxiliary content can be activated at the proper time in synchronization with the broadcast audio-video streams. Auxiliary data may be provided according to a batch scheme (e.g., as part of an electronic program guide or other out-of-band feature in which data for multiple programs is received simultaneously), for example. Other embodiments will use URLs or other links within the CATE signal to access needed data from a web server or other source in real time, near real time, just-in-time, and/or according to any other timing scheme, as appropriate.

In prior implementations, supplemental content triggers were embedded within closed captioning signals or the like. Closed captioning generally refers to receiving, formatting, and displaying text on a television or other display that allows viewers to access additional or interpretive information about programming content. Federal law mandates that all broadcast television programming in the United States must include closed caption information. For conventional digital (e.g., ATSC) television broadcasts, caption streams are typically encoded in a well-known format such as EIA-608 format, EIA-708 format, and/or the like. Most set top boxes (STBs) and other television receivers are therefore designed to interpret EIA-608, EIA-708 and/or similar formats in received broadcasts. Other closed captioning formats or standards may be implemented in the United States or elsewhere.

Closed captions often provide textual transcriptions of the audio portions of programs as the programs progress, thereby allowing the hearing impaired and others to follow the program content without listening to the audio track typically associated with the programming. Motion pictures, video disk (e.g., DVD) content, streamed audio/video, video games and the like may similarly incorporate closed captions using any number of standard or non-standard techniques.

More recently, some television systems have used the closed caption stream that accompanies broadcast programming to encapsulate prompts for some forms of supplemental content. Most conventional closed caption formats, including EIA-608 and EIA-708, however, can be severely limited in the amount of space that is available. EIA-608, for example, generally provides only enough space for a relatively small set of textual data. EIA-708 allows somewhat more data space for limited graphical capabilities, but even this expanded space is severely restricted for most purposes. As a result, enhanced content available from conventional closed caption systems can be severely limited.

As more and more consumers receive their television programming from video on demand (VOD) and similar non-broadcast sources of streaming video, the Society of Motion Picture and Television Engineers (SMPTE) and others have recommended a transition from the older closed caption standards (e.g., EIA 608/708) to more advanced "timed text" formats such as SMPTE-TT for streaming media, video on demand, and similar network-based delivery systems. Newer timed text formats commonly incorporates syntax, structures and tags similar to the extensible markup language (XML) to provide more advanced features and to improve flexibility in comparison to the more traditional legacy formats. The SMPTE-TT format is described in SMPTE Standard ST 2052-1-2010, which was approved on Dec. 3, 2010 and is incorporated herein by reference. The SMPTE standards are updated from time to time, and the various later versions should be considered to be equivalents of the initial 2010 standard. Equivalent timed text standards include the W3C Timed Text Markup Language (TTML) and Web Video Text Tracks (WebVTT), among others.

Timed text standards are generally intended for use with streaming video services and web content rather than terrestrial, satellite or cable broadcast television. As a result, the timed text standards by themselves generally lack the ability to function effectively in a broadcast television environment. At the very least, conventional timed text formats lack the ability to activate enhanced or auxiliary content in a broadcast setting.

Various embodiments, however, are able to expand the functionality of conventional timed text formats by providing carrier action text enhancement (CATE) signals within the timed text that can activate auxiliary content. The enhanced capabilities of timed text can be used to allow richer feature sets, to provide more data with the activation signal, to capitalize upon additional applications and features, and/or to provide other benefits as desired. To that end, set top boxes and other television receivers intended for consumer use can be designed to interpret timed text (e.g., SMPTE timed text) to identify CATE signals within broadcast television programming. Further, CATE signals may be useful within video streaming, second screen, place shifting, time shifting and/or any other television viewing environments.

The extensible features of timed text can flexibly allow for representation of new data types that could not be represented within closed caption-based systems. Unlike the previous closed caption formats that were limited to text or rudimentary graphics, the XML-like features of many timed text formats can be readily adapted to contain motion video content, URLs, software code (e.g., code in executable, compilable, interpretable and/or other form) or the like.

Enhanced or auxiliary content could expand the user experience in any number of ways. To provide just a few examples, auxiliary content could represent video content that is presented to a viewer on the television or other primary display. Such content may be activated by the user input, as desired. Other implementations could use the auxiliary content to deliver a software application executable by the receiver device to play a game or provide other interactive experiences with the viewer. Other implementations could use auxiliary content to provide web content, such as sports statistics, weather, news, information about the program being viewed (e.g., actor/actress information, electronic program guide information and/or the like), or any other information as desired.

In many cases, the auxiliary content is related to the programming that is currently shown. An advertisement, for example, could be enhanced with additional video or other content that is shown while playback of the main program is paused, or the viewer could be presented with an application or web page that provides more information about the product, or that processes an order for the product advertised. The application could be executed by the receiver device in some embodiments, and/or the receiver device could forward applications and/or data to second screen devices for execution, as desired.

To that end, some further embodiments could use the CATE signals to initiate the synchronized (or non-synchronized) presentation of supplemental applications or data on a second screen. In various embodiments, an application executing on a tablet or other computer, a mobile phone or another device could be activated in response to the CATE signal to thereby direct the application to present web content, to accept an order for a product, and/or to take any other action. Many other types of enhanced content could be provided in any number of alternate but equivalent embodiments.

Turning now to the drawing figures and with initial reference to FIG. 1, an example system 100 for activating enhanced content via timed text includes a content source 101 that includes a production system 102, a distribution system 104, and/or a transmission system 106 as appropriate. Content with formatted timed text information 105, once created, is provided over any sort of broadcast or other distribution channel 108 for rendering at a media receiver 110 and eventual playing on any sort of television display 120, second screen 130, and/or other display as appropriate. As shown in FIG. 1, timed text information 105 may be inserted into the programming at any stage of production 102, distribution 104 and/or transmission 106.

In various embodiments, the timed text content 105 may include closed caption data, as well as any CATE signals or the like that are interpretable by the receiving device to activate enhanced content 107. The stream of timed text 105 may itself also include some or all of the data 107 for presenting graphics, video, interactive features, web content and/or any other auxiliary content as desired, although other embodiments may deliver the actual content 107 via other mechanisms and paths, as described below.

Timed text 105 may be formatted in any manner. In various embodiments, timed text 105 includes conventional header information (as described by the SMPTE-TT or another specification) or other information that allows receiver 110 to properly interpret the timed text 105 that accompanies video programming rendered by the receiver 110. Such information may include the sizes and locations of data fields, for example, or other information relating to the structure, size, arrangement or other formatting of the timed text 105. In various embodiments, timed text 105 also carries information related to the presentation of caption or other data, such as location of presentation on the screen, scrolling speed or time, pop on/off data, timing data, and/or the like. Formatting information may be defined within the data itself 105 as desired (e.g., using XML or similar constructs), or defined externally by a standard, or by a schema sent via an electronic programming guide (EPG) feature or other out-of-band channel accessible to the receiver device no.

Receiver device no suitably receives broadcast content via direct broadcast satellite (DBS), terrestrial broadcast, cable broadcast or the like. Generally, the received content will be provided as an MPEG or similar multiplex with separate streams for video, audio, timed text and the like. Streams are synchronized for playback using a presentation time stamp (PTS) or the like. When the receiver 110 encounters a CATE signal in the timed text stream, this signal is interpreted to activate enhanced content such as a graphical or video presentation, an interaction with a purchasing or web application, and/or the like. Typically, the CATE signal in timed text 105 will indicate the timing of the auxiliary content and the particular data 107 that will be used. Again, different embodiments may deliver data 107 in any number of different ways: some embodiments may embed auxiliary data 107 within the timed text stream itself (see FIG. 2 below), whereas other embodiments may separate fetch or otherwise deliver data 107 via a network server 142, via a separate out-of-band signal contained in broadcast 108, and/or in any other way.

In the exemplary embodiment illustrated in FIG. 1, production system 102, distribution system 104 and transmission system 106 represent any systems, devices and/or organizations capable of producing, distributing and/or transmitting program content, respectively. As noted in FIG. 1, timed text content 105 may be inserted into the programming content in any manner at any stage of production, distribution and/or transmission. In various embodiments, timed text 105 is formatted and associated with the programming at the production stage 102 by an author, editor, producer or other party. Certain producers, distributors and/or broadcasters may have preferred formats for timed text 105, and each may produce, distribute and/or broadcast content using their own formats as desired. Format data may change from program to program, or may be consistent for each producer, distributor, broadcaster or other entity. All of the programs broadcast on a particular channel, for example, may have common format data that may nevertheless differ from the format data used by another network.

Timed text 105 may be encoded into any sort of programming in any manner, such as during a conventional "post production" phase or the like. Insertion of timed text 105 during or just after production may be appropriate in any sort of programming, including cinema programming, television programming or any other programming that is delivered in any sort of standard format, such as any form of MPEG format that can be rendered by a player/receiver device 110. In other embodiments, however, timed text 105 may be added to programming during intermediate distribution 104 (e.g., encoding or transcoding of programming that is stored onto DVDs or other portable media, or otherwise distributed to network affiliates, broadcasters and/or any other parties). In still other embodiments, timed text 105 may be inserted into the program stream just prior to broadcast or other transmission 106, much as current caption data is encoded in many current television broadcasts. Timed text 105 may also be inserted prior to place shifting or other streaming of a network video stream, or in any other setting as desired. Typically, timed text 105 is formatted and automatically inserted into the program stream by computerized machinery to so that the timed text content is digitally represented, formatted and stored on any appropriate media prior to transmission or other distribution.

Distribution channel 108 represents any sort of data link, broadcast or other wireless connection, physical media, and/or other avenue for delivering programming content. Examples of distribution channels could include, without limitation, broadcast television, very small aperture terminal (VSAT) satellite (e.g., for movie distribution), direct broadcast satellite (DBS), cable television, cellular or other wireless telephone networks, Internet or other data communications networks, and/or the like. As noted above, timed text 105 including CATE signals and/or auxiliary content 107 may be inserted into or otherwise encoded with programming content 108 in any manner, and at any phase of production, post-production, distribution and/or delivery of the programming content. Indeed, timed text 105 and/or auxiliary data 107 that is associated with a broadcast program 108 need not be provided with the video content itself. In some implementations, timed text 105 and/or auxiliary data 107 that is associated with a broadcast program 108 may be retrieved from a separate server (e.g., server 142) and/or other source of information, as desired. This timed text data 105 may supplement or be provided in addition to conventional closed caption data that may be provided within the broadcast, as desired.

Receiver 110 is any device, component, circuitry or logic capable of receiving and processing video programming content. As shown in FIG. 1, receiver no includes a receiver interface 112, a controller 113 with appropriate processor 116 and memory 118 resources, and a display interface 114 as appropriate. Some implementations may also include a network interface 117 for communicating on network 109, as appropriate. In various embodiments, receiver 110 is a conventional television receiver (e.g., a set top box or other broadcast, satellite and/or cable television receiver) capable of receiving signals via distribution channel 108 and providing an output signal 115 that can be displayed to the viewer. In various embodiments, display 120 is any sort of television or other monitor that is capable of receiving a program signal 115 from a set-top box, decoder or other external receiver 110 as desired.

Receiver interface 112 is any hardware, firmware and/or software interface capable of receiving programming content. In various embodiments, receiver interface implements a demodulator/decoder feature for receiving and demodulating digital television programming over a terrestrial broadcast, satellite, and/or cable programming medium.

The example television receiver 110 illustrated in FIG. 1 includes a storage medium 119, as appropriate. Storage medium 119 may be implemented as additional memory, as a disk drive, or in any other manner. Many embodiments may provide a digital video recorder (DVR) or other recording feature that allows content to be stored in storage medium 119 for later viewing. Such content may be stored with timed text 105 and/or data 107 to allow for decoding and viewing of auxiliary content at the time that the programming stored on the recorder is rendered. Although FIG. 1 shows data 107 stored within storage medium 119, equivalent embodiments could store this data in memory 118, and/or in any other memory, disk or other storage medium available to receiver 110, including any sort of cloud storage or other remote storage that is accessible over network 109 or the like.

Controller 113 is any sort of control logic or the like that interacts with receiver interface 112 and display interface 114 to output imagery to the viewer on display 120. Controller 113 also controls the reception, storage and processing of video content via receiver interface 112. To that end, controller 113 suitably directs the reception and storage of pre-set data 105, as well as the interpretation of timed text information 105 that is provided within received programming. Additional detail about such processing is provided below with respect to FIG. 3.

In various embodiments, controller 113 may be implemented using any sort of microprocessor, microcontroller, digital signal processor or other processor 116 capable of directing the actions and processes of receiver 110. Typically, processor 116 will be associated with any sort of memory 118, such as any sort of static, dynamic, flash or other memory capable of storing programming instructions and/or data for processing by processor 116. In various embodiments, receiver 110 is based upon a "system on chip" (SoC) implementation that incorporates a hybrid microcontroller 116 with memory 118, input/output and/or other features to perform the various signal processing and other actions of receiver 110. Various SoC and other integrated hardware implementations are available from Texas Instruments, Conexant Systems, Broadcom Inc., NXP Semiconductors Inc. and many other suppliers as appropriate. Other embodiments may implement processor 116 and/or memory 118 using any sort of application specific integrated circuit (ASIC) or the like. Still other embodiments may implement processor 116 and/or the other features of receiver 110 with any number of discrete and/or integrated processing components (e.g., any sort of microprocessor or microcontroller), memories 118, input/output features and/or other features as desired.

Display interface 114 is any physical and/or logical interface to display 120. As noted above, in some implementations receiver 110 and display 120 are provided in an integrated product (e.g., a conventional television). In other embodiments wherein receiver 110 provides video output signals 115 to an external display 104, such signals 115 may be provided in any compatible format. In embodiments wherein display 120 is a conventional television, for example, display interface 114 may provide video output signals 115 in any conventional format, such as component video, composite video, S-video, High-Definition Multimedia Interface (HDMI, e.g., any version of the CEA-861 standards), Digital Visual Interface (DVI), IEEE 1394, universal serial bus (USB) and/or any other formats as desired.

Display 120 is any sort of television, monitor and/or other display capable of presenting video imagery 122 to a viewer. In various embodiments, display 120 operates in conjunction with receiver 110 to generate video imagery 122 in any manner. Other embodiments may combine the functions and components of receiver 110 and display 120 into a common housing, as in a conventional television with a built-in tuner or other receiver. In the example illustrated in FIG. 1, imagery 122 is generated with auxiliary content 124 that is activated within timed text 105.

Network interface 117 operates using any implementation of protocols or other features to support communication by device 102 on network 109. In various embodiments, network interface 210 supports conventional LAN, WAN or other protocols (e.g., the TCP/IP or UDP/IP suite of protocols widely used on the Internet) to allow device 102 to communicate on network 109 as desired. Network interface 117 typically interfaces with network 109 using any sort of LAN adapter hardware, such as a conventional network interface card (NIC) or the like provided within device 102. Network interface 117 could be implemented with a conventional ETHERNET controller chip that operates with a conventional electrical transformer to communicate over a conventional RJ45 jack in at least one embodiment, although other embodiments may provide different features, including any sort of WI-FI or other wireless interface as desired.

In some embodiments, television receiver 110 operates in conjunction with a second screen device 130 such as a tablet computer, personal computer, mobile telephone, video game playing device, or the like. Second screen device typically includes conventional computing hardware such as a processor, memory and interfaces to network 109 or the like. In many embodiments, device 130 executes a media player or other application 132 that communicates with the receiver 110 to obtain media streams, auxiliary content 107 and/or instructions to process certain features, as desired. In the example illustrated in FIG. 1, second screen device is a tablet or similar device that presents auxiliary content related to the broadcast content that is being rendered on display 120. The auxiliary content may be synchronized to the content on display 120 using PTS information and/or instructions transmitted from the receiver device 110 to device 130, as desired. Device 110 may respond to certain CATE signals, for example, by instructing the second screen device to present a user prompt for more information (as shown in FIG. 1), to present web content obtained from a URL contained in the CATE signal that is forwarded by the receiver 110, to execute an applet or other software module, or the like. Media content, URLs, software modules and content 107 may be transferred from the receiver 110 to device 130 in some embodiments, and/or device 130 may be able to directly download the appropriate content 107 from web services 142 or the like, as desired, using URLs contained within CATE signals and forwarded to device 110 by receiver device 110. Processing auxiliary content on the second screen device 130 could allow viewers to obtain additional information or to place orders without disturbing other viewers of display 120 or holding up playback of the broadcast program 108, as desired. Many equivalent embodiments could be created to make further use of the second screen device 130, as desired.

In practice, then, receiver 110 suitably receives television-type programming in any format or medium. The programming may be received at receiver interface 112 from any broadcast or other transmission source, from any sort of streaming or portable media source, and/or any other distribution channel 108. The programming is provided with (or at least associated with) timed text information 105 that includes caption or other information. This information 105 may be extracted from the programming stream, obtained from a network service 109, and/or otherwise obtained from any other source as described herein. The timed text 105 is interpreted by the viewer's television receiver 110, and any CATE signals occurring within the timed text 105 are processed to activate enhanced content, as described herein. Timed text and program content may be further processed in conjunction with any user preferences or other information to generate suitable imagery on display 120 and/or on secondary device 130 to thereby present the program and the timed text information to the viewer as desired.

Video, graphical, application or other data 107 used to implement the auxiliary feature activated by CATE signals in timed text 105 may be delivered to the receiver 110 in any manner. In various embodiments, data 107 is provided through the same distribution channel 108 as the program itself, such as through the timed text stream 105. Data 107 may be equivalently delivered as part of the out-of-band data generally associated with an electronic program guide (EPG) or the like. Such data may be delivered to receiver device 110 via an out-of-band signal that is separate from television programming signals, but that uses the same DBS, cable or other distribution medium that is used to deliver the programming signals, as desired.

In other embodiments, timed text 105 and/or auxiliary content 107 may be delivered to receiver device 110 from a separate source via a backchannel such as the Internet, a telephone link, and/or another data communications network. Such embodiments may provide data 105 and/or 107 from a server 142 operating on the network 109 that delivers data 105 in response to requests placed by receiver 110, as desired. Such requests may be posited on a batch or as-needed basis, as described more fully below.

Receiver device 110 may support other functions and features in addition to those described above. In various embodiments, device 110 includes a digital video recorder (DVR) feature that stores broadcast programs to storage 125 or the like for time shifted viewing. Device 110 may also support live or delayed encoding/transcoding of received programs for place shifting to a remote device 130, such as a notebook, tablet or other computer, or a mobile phone, video game player or other media device. In such embodiments, timed text 105 may be stored with the DVR and/or place shifted along with the audio and video content so that that time shifted and/or place shifted video stream is nevertheless able to support the auxiliary features 124 activated by the timed text 105 during playback at later times and/or other locations. Put another way, the timed text 105 and associated data 107 may be retrieved and/or interpreted at any time and location of playback, thereby allowing auxiliary features 124 whenever and wherever the media stream is played back. If the timed text data 105 and auxiliary data 107 is available to the playback device, the device may be able to provide the enhanced content just as though the viewer was watching a live broadcast at his or her own television receiver. A DVR application, for example, could process stored timed text 105 containing CATE signals that activate stored auxiliary content 107 during time shifted playback. A place shifting client could similarly process CATE signals and auxiliary content delivered via a place shifted media stream, as desired.

In the example illustrated in FIG. 1, the timed text 105 accompanying a broadcast television program includes one or more CATE signals that activate enhanced features 124 at certain times during playback of the broadcast program. FIG. 1, for example, provides an overlay during playback of a commercial occurring during broadcast 108 on display 120. The overlay content 124 in this instance allows the viewer to push a button for more information and/or to complete an order for the advertised product. This overlay may be active for the duration of the commercial (e.g., as described by PTS data in the CATE signal), and/or for some period of time after the commercial is complete. If the user does select one of the buttons for further content, then video, graphical or other content 107 may be presented, an application provided as data 107 could be executed on receiver device 110, and/or web content referenced by a URL in the CATE signal could be provided, as desired. Other embodiments could forward information from the CATE signal to a second screen device 130 so that the auxiliary content 107 is delivered via application 132 executing on device 130. Equivalent embodiments may expand, alter or otherwise modify these features in any way, and/or may provide other types of auxiliary content 107, as desired.

FIG. 2 shows one example of a timed text stream 105 that includes data 107A-E for auxiliary content 124, as well as CATE signals 211, 212, 213, 214 and 215 that activate various events. In this example, data 107 could include graphics, video, text, source or binary code, applications/applets and/or other data as desired. In this example, data 107 is delivered in the stream prior to the CATE signal 211-215 that activates the use of that data 107. Data 107A, for example, may include graphics, imagery, code or other data that would be useful to receiver 110 in responding to an event activated by CATE signal 211.

Timed text stream 105 as shown in FIG. 2 may be delivered as part of an MPEG multiplex or other package that also includes one or more video streams 202, audio streams, and/or the like. The timed text stream 105 could augment a conventional closed caption stream in some embodiments, or the closed caption stream could be combined with the timed text stream 105 as desired. Generally, the various streams within a package 200 would share a common time reference, such as an MPEG presentation time stamp (PTS). This time reference allows activated content to be synchronized with events occurring during the video stream 202, as desired. That is, auxiliary content can be activated for the viewer at the particular times indicated within the CATE signal, as appropriate.

In some embodiments, it may be desirable for the CATE signal to be delivered prior to the time of the video event so that the receiver 110 has time to obtain, interpret and/or otherwise process the auxiliary content for display at the appropriate time during the video presentation 202. Signals 221 and 225 in FIG. 2, for example, would include a PTS that identifies the time that the auxiliary content is activated even though the signal itself is received prior to that time in the presentation. This lead time allows the receiver 110 to retrieve data from server 142, to store the retrieved data 108 into compile, interpret or otherwise process executable code contained in data stream 105, or to take other actions as needed. Other embodiments may provide features in the timed text 105 that allow the receiving device 110 to obtain any needed content 107 before it is needed. Such content will typically be identified in a manner that is referenced by the CATE signal so that the content can be readily and quickly activated when the CATE signal is received and processed.

The CATE signals 211-225 themselves will typically contain sufficient information to activate the desired auxiliary content 107 at the appropriate times during playback of the video stream 202. In various embodiments, CATE signals are described by an XML or similar schema that allows the signal to specify the times that the auxiliary contents are active (e.g., a beginning and ending PTS), the type of auxiliary content (e.g., video, graphical, textual, interactive, URL, etc.) and/or the location of data 107 needed to execute the auxiliary function.

Data 107 may be formatted in any manner. In various embodiments, data 107 that is delivered via stream 105 may be described in an XML schema or the like that describes the various types and locations of specific data types within a larger data structure. As noted above, data 107 may be delivered within the stream 105 in some embodiments, whereas equivalent embodiments could download the data 107 from an external service 142, or deliver the data using an EPG or similar out-of-band transmission over broadcast medium 108.

The timed text stream 105 may be stored in a DVR 125, forwarded to a second screen or other display device 130 via place shifting, and/or otherwise processed along with the video stream 105, as desired. Whenever and wherever the video program is decoded, the timed text stream 105 may be similarly interpreted so that auxiliary content "follows" the video stream 202. For example, if a user stores a broadcast program on a DVR 125 for later viewing, the timed text 105 is still interpreted at the time of playback so that data 107 can be retrieved and/or processed as desired. Similarly, other media players 130 that obtain place shifted streams or encoded media files from receiver 110 may be similarly programmed to interpret the timed text 105 in the same manner as receiver 110. That is, second screen device 130 can interpret timed text 105 to process CATE signals 211-225, to retrieve data 107 from any appropriate source, and/or to process and provide auxiliary content to the viewer on the display associated with the device 103, as desired.

With reference now to FIG. 3, an example method 300 for processing timed text 105 at a video receiver such as receiver 110 suitably includes the broad functions of receiving the data 107 associated with the auxiliary content (function 202), interpreting the timed text associated with a received broadcast to identify CATE signals that activate auxiliary events (functions 306-308), and then responding to the occurrence of a CATE signal to process the auxiliary content at the desired time(s). Method 300 may be repeated as needed for any number of different programs (function 312), as desired.

Data 107 used to implement the auxiliary content may be received at any time, and according to any temporal basis (function 302). Auxiliary content data 107 may be obtained in batches, or in any sort of "as-needed" or "on-demand" basis, as appropriate. Batch processing could represent any technique for obtaining auxiliary data 107 for multiple broadcasts at the same time, such as providing the data 107 as part of a program guide or other regular download to receiver 110 from a broadcaster 106 or other source. To that end, data 107 may be received via an out-of-band channel separate from the programming content, but still part of a DBS, cable or other distribution channel 108. Other implementations may allow receiver 110 to request the data 107 from a service 142 available via network 109 or another back channel, as desired. Such data could be requested from a URL contained in a CATE signal broadcast prior to the start of the auxiliary content, such as signals 221 and 225 described above. Still other embodiments could receive data 107 as part of the timed text stream 105, as described with reference to FIG. 2 above. Data 107 may therefore be provided automatically (e.g., as part of a regular batch download), in response to requests placed by the receiver 110, as part of a broadcast or on demand stream, and/or in any other manner as desired. In some implementations, the receiver 110 may assume certain default values for URLs or other types of data 107 if no explicit data 107 is received. Such default values may be associated with the content provider, the programming channel, the program itself, the manufacturer of the receiver 110, the geographic region of the receiver 110, and/or any other factors as desired. Data 107 is stored within receiver 110 until it is needed. As noted above, data 107 may be stored within memory 118, within storage medium 117, and/or in any other storage medium available to receiver 110 as desired.

Program content is received and decoded in any suitable manner (function 306). In various embodiments, broadcast content may be received by controlling a tuner within receiver 112 to select a channel containing programming desired by the viewer; this programming is received and decoded as appropriate. In various embodiments, content is received as an MPEG or similar multiplex that includes multiple component streams each containing video, audio, timed text and/or other information. In such embodiments, timed text 105 may be provided within a data stream, as described above, or in any other appropriate manner.

As noted previously, the timed text 105 associated with the particular program is interpreted to identify carrier-based active text enhancement signals that activate auxiliary content or events (function 306). CATE signals may be identified through headers or codes used within the stream, or by other features in accordance with the timed text format that is in use. As noted above, CATE signals will typically specify a start and end time (e.g., by PTS), a type of auxiliary content to be presented, and/or the location of the data 107 that is associated with the activated event. Other embodiments could provide additional or alternate content, as desired.

If a CATE signal is identified (function 308), then the information in the signal is processed to render the auxiliary content (function 310). As noted above, the signal is interpreted by the processing device to locate associated data 107 and to render the auxiliary content at the appropriate times. Many different types of auxiliary content could be provided in a wide range of alternate embodiments. Some embodiments may allow the viewer to view additional textual, graphical and/or video content, for example. Other embodiments could connect the viewer to a URL or other service via network 109 to complete purchase of an indicated product, to obtain additional information about displayed content, to play games associated with the displayed content, to obtain auxiliary information (e.g., sports statistics, information about actors and actresses appearing in a displayed feature, etc.) and/or any other features as desired.

As noted above, various embodiments may use CATE signals to initiate functions or features on a tablet or other second screen device 130. In some implementations, the receiver device 110 maintains a data connection with the second screen device 130 so that instructions may be sent from device 110 to a media player or other application executing on device 130. Upon receipt of an instruction from device 110, the application executing on device 130 suitably obtains and/or renders auxiliary content 107 on the display of the second screen device 130, as desired. Such embodiments may maintain timing between the application executing on device 130 and the playback of media content by device 110 so that the second screen presentation remains in synch with the content, thereby allowing the viewer to conveniently obtain additional information or to take other actions (e.g., to place an order) relating to objects or other content currently on the display.

In some embodiments (e.g., in place shifting applications), second screen device 130 may also act as a receiver device 110. That is, the second screen device 130 may receive broadcast content indirectly via a place shifting device, a video service and/or any other source (e.g., device 110, a remote service digital video recorder (RSDVR) or video on demand service on network 109, or the like). Even if the broadcast television content is received indirectly, some embodiments could allow the second screen device 130 to process timed text 105, to obtain auxiliary content 107, to identify CATE signals relating to the received content, and to render the content to the viewer as part of the viewing experience, as desired.

Generally speaking, the various functions and features of method 300 may be carried out with any sort of hardware, software and/or firmware logic that is stored and/or executed on any platform. Some or all of method 300 may be carried out, for example, by logic executing within receiver 110 in FIG. 1. In one embodiment, processor 116 executes software logic that performs each of the various functions shown in FIG. 3. Such logic may be stored in memory 118 or in any other storage available to processor 116 as desired. Hence, the particular logic and hardware that implements any of the various functions shown in FIG. 3 may vary from context to context, implementation to implementation, and embodiment to embodiment in accordance with the various features, scenarios and structures set forth herein. The particular means used to implement each of the various functions shown in FIG. 3, then, could be any sort of processing structures that are capable of executing conventional software logic in any format. Such processing hardware may include processor 116 or other components of receiver 110 in FIG. 2, as well as any other processors or other components associated with any conventional television, receiver, media player and/or the like.

The general systems, structures and techniques described above may be inter-combined, enhanced, modified and/or otherwise implemented to provide any number of different features. Although the preceding discussion focuses primarily on broadcast sources of television, for example, equivalent embodiments could apply the same features in any other context, including any sort of satellite, cable, terrestrial or other transmittable format, as well as any sort of stored media format (e.g., DVD, including conventional DVD formats as well as any sort of BLU-RAY or other high definition disk format), streaming video format (e.g., streaming video over the Internet or another network, as well as streaming over a telephone or other wireless network), cinema format and/or the like.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system to process auxiliary content associated with broadcast television programming for presentation of the broadcast television programming including the auxiliary content on a second screen device that is separate from the system but in communication with the system during time shifted playback of the broadcast television programming, the system comprising:

a television receiver interface configured to receive a live television broadcast comprising the broadcast television programming and the auxiliary content associated with the broadcast television programming, wherein the live television broadcast is received with timed text comprising a carrier-based active text enhancement signal that identifies the auxiliary content in the television broadcast and an upcoming time to present the auxiliary content;

a data storage configured to store the broadcast television programming as a recorded television program along with the auxiliary content associated with the broadcast television programming; and a processor configured to provide a place shifted video stream of the stored broadcast television programming to the second screen device that includes the timed text comprising the carrier-based active text enhancement signal, wherein the second screen device is configured to receive the place shifted video stream, to interpret the timed text associated with the received broadcast television programming and to thereby recognize the carrier-based active text enhancement signal in the timed text that identifies the auxiliary content in the television broadcast, wherein the data associated with the auxiliary content is received by the system via the television receiver interface in the live television broadcast as a stream with the timed text prior to the time during the live television broadcast to present the auxiliary content and provided to the second screen device with the place shifted video stream, wherein the recorded television program is rendered for playback to the viewer by the second screen device at a time after the broadcast, and wherein the auxiliary content stored with the recorded television program is transferred from the system to the second screen device prior to the time to present the auxiliary content during the playback of the recorded television program, and wherein the second screen device detects the carrier based active text enhancement signal in the timed text and initiates processing of the data associated with the previously-received auxiliary content in response to the carrier-based active text enhancement signal in the timed text to render the auxiliary content in time synchronization with the presentation of the recorded television program by the second screen device.

2. The system of claim 1 wherein the stream is contained within an MPEG multiplex that is broadcast as part of the live broadcast television programming.

3. The system of claim 2 wherein the carrier-based active text enhancement signal specifies a presentation time stamp identifying a time during playback of the television broadcast that the previously received auxiliary content is active on the second screen device.

4. The system of claim 1 wherein the system further comprises a network interface to a network, and wherein at least some of the data associated with the auxiliary content is retrieved from a service on the network via the network interface and stored in the data storage prior to the time during the live broadcast to present the auxiliary content identified by the carrier-based active text enhancement signal that initiates the processing of the data.

5. The system of claim 2 wherein the system further comprises a network interface to a network, and wherein at least some of the data associated with the auxiliary content is retrieved from a service on the network via the network interface prior to the time during the live broadcast to present the auxiliary content in response to a uniform resource locator (URL) contained in the carrier-based active text enhancement signal that initiates the processing of the data.

6. The system of claim 1 wherein the auxiliary content comprises video content that is played by the second screen device in response to a viewer input, and wherein a prompt for the viewer input is presented in response to the carrier-based active text enhancement signal.

7. The system of claim 1 wherein the auxiliary content received with the television broadcast comprises a software application that is executed by the second screen device in response to a viewer input, and wherein a prompt for the viewer input is presented in response to the carrier-based active text enhancement signal.

8. The system of claim 1 wherein the timed text is formatted in accordance with a SMPTE timed text standard.

9. The system of claim 1 wherein the timed text is formatted in accordance with a W3C Timed Text Markup Language (TTML) standard.

10. The system of claim 1 wherein the timed text is formatted in accordance with a Web Video Text Tracks (WebVTT) standard.

11. A method performed by a television receiver device to provide enhanced time shifted content to a viewer of a live broadcast television program via a second screen device that is separate from the television receiver device, the method comprising:

receiving the live broadcast television programming by the television receiver device as a live television broadcast, wherein the received broadcast television programming is associated with a stream comprising timed text that comprises at least one text enhancement signal, the text enhancement signal identifying the enhanced content and an upcoming time during playback of the live television broadcast that the enhanced content will be active on the second screen device;

receiving the enhanced content at the television receiver device as part of the media stream that comprises the at least one carrier-based active text enhancement signal, wherein the enhanced content is received by the television receiver device as part of the live television broadcast prior to the time during the live television broadcast that the enhanced content is active;

storing the received live television broadcast including the enhanced content as a recorded television program in a digital video recorder by the television receiver device; and during subsequent playback of the recorded television program from the recording stored in the digital video recorder, the television receiver device providing a place shifted video stream of the stored broadcast television programming to the second screen device that includes the timed text comprising the carrier-based active text enhancement signal, wherein the second screen device is configured to receive the place shifted video stream and the enhanced content received as part of the broadcast television program from the television receiver device prior to the upcoming time during playback of the recorded television program that the enhanced content will be active on the second screen device;

wherein the second screen device receives the place shifted video stream from the television receiver device and interprets the timed text during playback of the recorded television program to thereby identify the at least one carrier-based active text enhancement signal in the timed text, and wherein the second screen device responds to the at least one carrier-based active text enhancement signal in the timed text to provide the previously received and stored enhanced content to the viewer to thereby maintain time synchronization with the playback of the recorded television program.

12. The method of claim 11 wherein the receiving of the timed text is received by the television receiver as part of the live broadcast television programming.

13. The method of claim 12 wherein the enhanced content is received as part of the timed text.

14. The method of claim 11 wherein the enhanced content comprises motion video content that is received as part of the timed text received as part of the live broadcast television programming prior to the upcoming time that the enhanced content is active.

15. The method of claim 11 wherein at least some of the enhanced content is received via a server on a network.

16. The method of claim 15 wherein the at least one carrier-based active text enhancement signal comprises a uniform resource locator that identifies a location of the enhanced content on the network.

17. The method of claim 11 wherein the enhanced content is received via an out-of-band signal transmitted via the same medium as the live broadcast television programming.

18. The method of claim 11 wherein the enhanced content comprises video content that is played in response to a viewer input, and wherein a prompt for the viewer input is presented in response to the carrier-based active text enhancement signal.

19. The method of claim 11 wherein the enhanced content comprises a software application that is executed by the second screen device in response to a viewer input, and wherein a prompt for the viewer input is presented in response to the carrier-based active text enhancement signal.

20. The method of claim 11 further comprising the television receiver device establishing a data connection with the second screen device prior to the television receiver receiving the carrier-based text enhancement signal in the timed text, wherein the television receiver device transfers the enhanced content to the second screen device via the data connection, and wherein the television receiver device instructs the second screen device to provide the enhanced content by transmitting the instruction to the second screen device via the data connection at the time during playback of the live broadcast program that is indicated by the carrier-based active text enhancement signal.

* * * * *